(12) United States Patent
Mundt

(10) Patent No.: US 6,578,355 B1
(45) Date of Patent: Jun. 17, 2003

(54) BLOOM MIXER FOR A TURBOFAN ENGINE

(75) Inventor: Christian Mundt, Eichwalde (DE)

(73) Assignee: Rolls-Royce Deutschland Ltd & Co KG, Dahlewitz (DE)

( * ) Notice: Subject to any disclaimer, the term of this patent is extended or adjusted under 35 U.S.C. 154(b) by 0 days.

(21) Appl. No.: 09/623,739
(22) PCT Filed: Mar. 3, 2000
(86) PCT No.: PCT/EP00/01894
§ 371 (c)(1), (2), (4) Date: Apr. 9, 2001
(87) PCT Pub. No.: WO00/53915
PCT Pub. Date: Sep. 14, 2000

(30) Foreign Application Priority Data

Mar. 5, 1999 (DE) .......... 199 09 792
Nov. 3, 1999 (DE) .......... 199 52 797

(51) Int. Cl.[7] .............. F02K 1/48; F02K 3/04
(52) U.S. Cl. ............ 60/262; 60/264; 239/265.17; 239/265.19; 181/220
(58) Field of Search ........... 60/262, 264; 239/265.17, 239/265.19; 181/213, 220

(56) References Cited

U.S. PATENT DOCUMENTS

| | | |
|---|---|---|
| 4,288,984 A | 9/1981 | Bhat et al. |
| 4,302,934 A | 12/1981 | Wynosky |
| 4,401,269 A | 8/1983 | Eiler |
| 4,487,017 A | 12/1984 | Rodgers |
| 4,543,783 A | 10/1985 | Kirker |
| 4,548,034 A | 10/1985 | Maguire |
| 4,576,002 A * | 3/1986 | Mavrocostas ........... 60/264 |
| 4,813,230 A | 3/1989 | Braithwaite |
| 5,117,628 A | 6/1992 | Koshoffer |
| 5,884,472 A | 3/1999 | Presz, Jr. et al. |
| 6,012,281 A * | 1/2000 | Hauser ........... 239/265.17 |
| 6,082,635 A * | 7/2000 | Seiner et al. ........... 239/265.19 |

FOREIGN PATENT DOCUMENTS

| | | |
|---|---|---|
| DE | 3039706 | 5/1981 |
| DE | 3132074 | 3/1982 |
| EP | 0913568 | 5/1999 |
| EP | 0916834 | 5/1999 |
| GB | 2119859 | 11/1983 |
| GB | 2160265 | 12/1985 |
| JP | 9133046 | 5/1997 |
| JP | 9170453 | 6/1997 |

* cited by examiner

Primary Examiner—Ted Kim
(74) Attorney, Agent, or Firm—Davidson Berguist; Klima & Jackson LLP

(57) ABSTRACT

The invention relates to lobe-type mixer tube for a bypass jet engine in which a bypass flow delivered by a fan is mixed with a hot gas stream issuing from the core engine, said lobe-type mixer tube having essentially circumferentially equally spaced gutter-shaped, radially moderately alternately inward and outward directed ducts to guide both the bypass flow and the hot gas stream, said ducts each having an end formed by an essentially plane extreme section and the respective extreme sections of some ducts when viewed in a longitudinal section extending in the direction of flow being inclined vis-a-vis the extreme sections of the other ducts. In this arrangement the radially outward directed ducts, when viewed circumferentially, alternately issue at points offset one from the other. In a preferred aspect, every other of the moderately radially outward directed ducts, when viewed circumferentially, has an extreme section which extends essentially normal to the centerline of the lobe-type mixer tube, while the extreme sections of the intervening moderately radially outward directed ducts are inclined counter the direction of flow and are therefore scarfed inversely.

12 Claims, 5 Drawing Sheets

BLOOM MIXER FOR A TURBOFAN ENGINE

BACKGROUND OF THE INVENTION

This invention relates to a lobe-type mixer tube for a bypass jet engine in which a bypass flow delivered by a fan is mixed with a hot gas stream issuing from the core engine, said lobe-type mixer tube having essentially circumferentially equally spaced gutter-shaped, radially moderately alternately inward and outward directed ducts to guide both the bypass flow and the hot gas stream, said ducts each having an end formed by an essentially plane extreme section and the respective extreme sections of some ducts when viewed in a longitudinal section extending in the direction of flow being inclined vis-a-vis the extreme sections of the other ducts, so that the various ducts when viewed in the direction of flow issue at various points offset one from the other. For the known state-of-the-art, reference is made, e.g., to GB 2 160 265 A.

The efficiency, i.e. the specific fuel consumption of bypass jet engines can be improved by mixing the hot gas stream from the core engine with the cold outer mass flow of the bypass stream before the mixed gases are expanded in their flow through a nozzle. This phenomenon is witnessed by thermodynamics theory and essentially relies on the divergence of the isobars in the enthalpy-entropy diagram. Another benefit achieved by internally mixing together the two streams of a bypass jet engine is in the accompanying reduction of jet noise, which is an important factor especially in the takeoff stage of the aircraft powered by this engine. Theoretical considerations regarding the boost in efficiency and the reduction in noise that can be achieved by mixing, however, show that the potential has not been fully exhausted.

To improve the mixing action, use is normally made of lobe-type mixer tubes to increase the contact surfaces between the bypass flow and the hot gas stream and produce helpful swirls in the mixing zone. To improve the three-dimensional mixing in the mixing zone of a lobe-type mixer to be, scarfing is used, which denotes a configurational modification to lobe-type mixer tubes through which the radially inward directed ducts of the lobe-type mixer tube are alternately trimmed axially in a circumferential direction, or are left untrimmed or are even extended. A lobe-type mixer tube of this description is disclosed in the initially cited patent GB 2 160 265 A, where the respective ends of the ducts are essentially formed by plane, extreme sections and these extreme sections of some of the ducts are inclined vis-a-vis those of the other ducts.

BRIEF SUMMARY OF THE INVENTION

The design of a lobe-type mixer tube generally constitutes a tradeoff between the requirement for maximum mixing efficiency and that for minimum pressure losses associated with it. The degree of mixing efficiency is affected by a number of constraints, such as the penetration of the lobe-type mixer tube referred to the diameter of the exhaust pipe surrounding it and the path length to the point where expansion occurs in the nozzle, referred to nozzle diameter. The resultant pressure losses are a combination of friction and deflection losses.

A broad aspect of this invention is to provide means on a lobe-type mixer tube in accordance with the generic part of claim 1 that enable the mixing efficiency to be enhanced without producing accompanying pressure losses.

Its is a particular object of this invention to provide an arrangement in which the radially moderately outward directed ducts, when viewed circumferentially, alternately issue at points offset from each other when viewed in the direction of flow. Further objects and advantages of this arrangement will become apparent from the subclaims.

In a further aspect of the present invention, four each circumferentially successive ducts form a group that repeats over the entire circumference and consists of a pair of radially moderately outward directed ducts and a pair of radially moderately inward directed ducts, one each duct of a pair being shorter and the other duct of the pair being longer than the other duct, where when viewed circumferentially, each longer inward directed duct is followed by a longer outward directed duct, which is followed by a shorter inward directed duct which in turn is followed by a shorter outward directed duct. Further objects and advantages will become apparent from the subclaims.

In a further aspect of the present invention, every other radially moderately inward directed duct is trimmed axially, or scarfed as described in the previously repeatedly cited patent specification GB 2 160 265 A. Additionally, however, every other radially moderately outward directed duct is scarfed as well. Accordingly, the extreme sections of a pair of circumferentially successive, radially inward directed ducts are inclined vis-a-vis each other, as are the extreme sections of a pair of circumferentially successive, radially outward directed ducts. In other words, both the radially moderately outward directed ducts and the radially moderately inward directed ducts come in two different lengths of duct, when taking the length of duct to be the length of duct wall or lobe-type mixer tube as measured in the direction of flow.

In accordance with the present invention, therefore, we practically have a group of four different ducts, i.e., one each shorter and one each longer moderately radially outward directed duct and one each shorter and one each longer moderately radially inward directed duct. In this arrangement, the ducts are disposed as indicated, i.e. in a circumferential view, a longer inward directed duct is followed by a longer outward directed duct, which in turn is followed by a shorter inward direct duct that is followed by a shorter outward directed duct. A lobe-type mixer tube in accordance with the present invention has several such groups circumferentially spaced around its circumference. Here, a periodic arrangement may be selected, where a first group is followed by a second group in which the ducts are arranged in the same sequence as in the first group. An axially symmetrical iteration may alternatively be selected, however, such that a first group is followed by a second group in which the ducts are arranged axially symmetrical with the first group.

These aspects of the present invention appreciably enhance the three-dimensional mixing effect and hence the mixing efficiency of the of lobe-type mixer tube. Considering that the surface area of a lobe-type mixer tube increases overproportionately when viewed radially outward, scarfing the lobe-type mixer tube as described on its outer side, i.e. at its radially moderately outward directed ducts, largely reduces the surface area, advantageously reducing weight and optimizing the pressure loss. The improved geometric flexibility improves the spatial distribution of the swirls induced at or in the lobe-type mixer tube, so that a more complex and hence optimal mixing process results.

It should here be remembered that the intended improvement of the mixing action is achieved also by the differences in length of said various ducts, so that to achieve the desired effect it may not necessarily be required to heavily trim, e.g., every other duct axially. Rather, some of the ducts may alternatively also be extended in length, while adjacent ducts may exhibit an extreme section that essentially extends in a direction essentially normal to the direction of flow. Whereas a weight advantage is optimally achieved by said axial scarfing. Also, the total number of lobes of the inventive lobe-type mixer tube should be a multiple of 4, allowing an accurate periodicity to be set, where a certain number of duct groups exists in the lobe-type mixer tube and each group is complete in itself, consisting of said four ducts of various lengths.

BRIEF DESCRIPTION OF THE DRAWINGS

Further objects and advantages of the present invention are described by way of a preferred embodiment which are shown in the attached drawings, where.

DETAILED DESCRIPTION OF THE INVENTION

Figure 1:
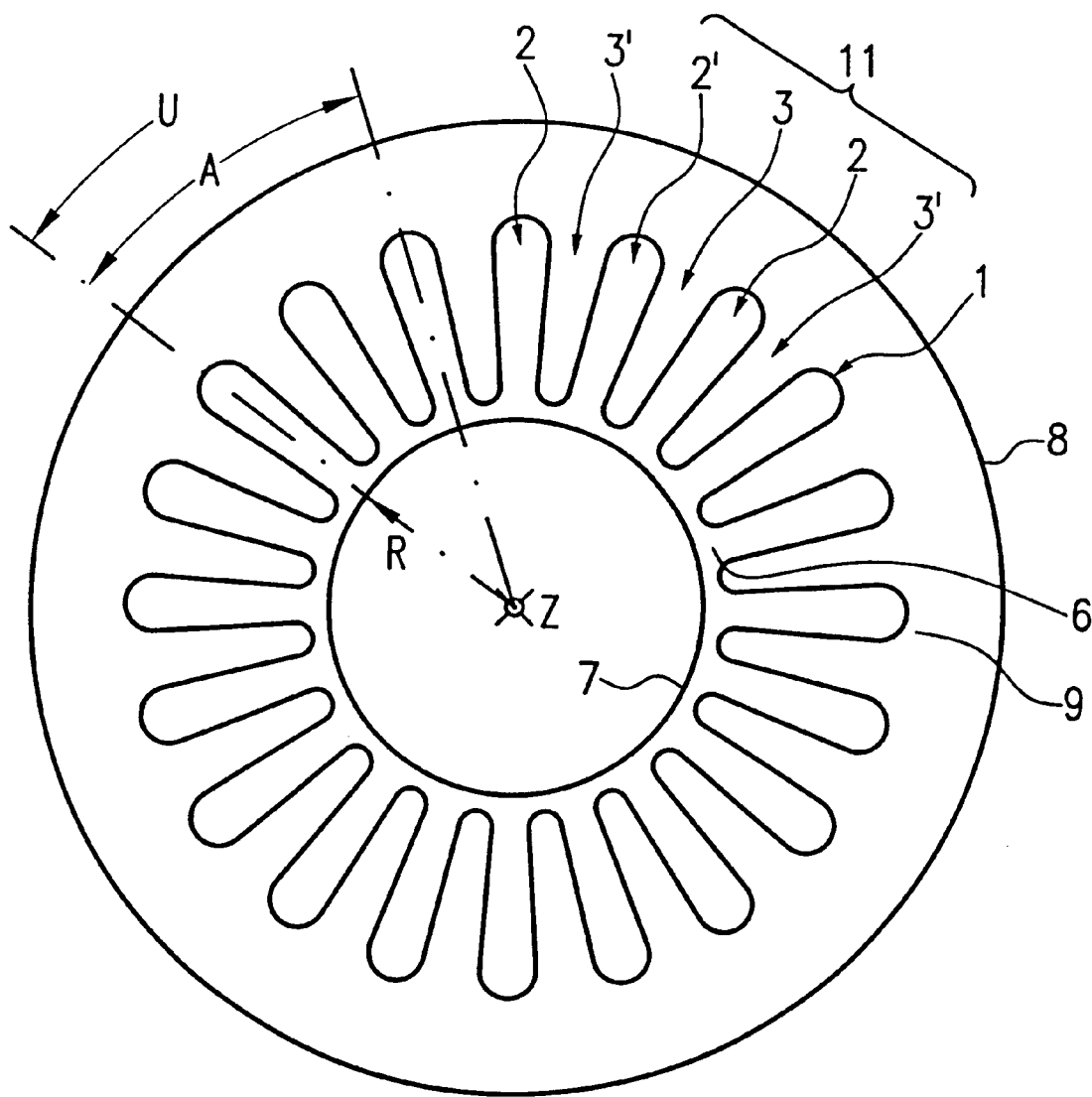
FIG. 1 is shown in a rear view (taken against the flow direction)

In its basic arrangement, a lobe-type mixer tube designed in accordance with the present invention resembles the state of the art disclosed in said patent specification GB 2 160 265 A, to which express repeat reference is made. A person skilled in the art knows that a lobe-type mixer tube is an essentially tubular shape whose outer shell, however, is not formed by a straight circular cylinder. Rather, as it will become apparent from FIG. 1, the cylindrical surface 1 of the lobe-type mixer tube takes a more or less corrugated shape, so that this cylindrical surface 1 forms a plurality of gutter-shaped ducts 2, 2', 3, 3' which essentially extend along the centerline Z of the lobe-type mixer tube. This centerline Z is the longitudinal centerline of the more or less tubular lobe-type mixer tube and in FIG. 1 extends in a direction normal to the drawing plane.

Ducted through this lobe-type mixer tube arranged in the aft area of a fan jet engine are, one, the hot gas stream 4 from the core engine of the fan jet engine and, two, the bypass flow 5 delivered by a fan of said jet engine (cf. FIGS. 2, 3), the direction of flow S of these two gas streams 4, 5 running essentially parallel to the centerline Z.

In the process, the hot gas stream 4 is routed into the interior 6 of the lobe-type mixer tube, projecting into which is a low-pressure turbine cone 7 which is arranged concentrically with the centerline Z and in FIG. 1 is indicated by a circle, so that hot gas stream 4 flows through the annulus between the low-pressure turbine cone 7 and the cylindrical surface 1 of the lobe-type mixer tube in a direction counter the direction of view of FIG. 1. The cold bypass flow 5 is routed outside the cylindrical surface 1 of the lobe-type mixer tube within an annulus 9 formed by the cylindrical surface 1 and an exhaust tube 8 (see also FIG. 1) surrounding the lobe-type mixer tube to flow in a direction again counter that of the view in FIG. 1.

Figure 2:
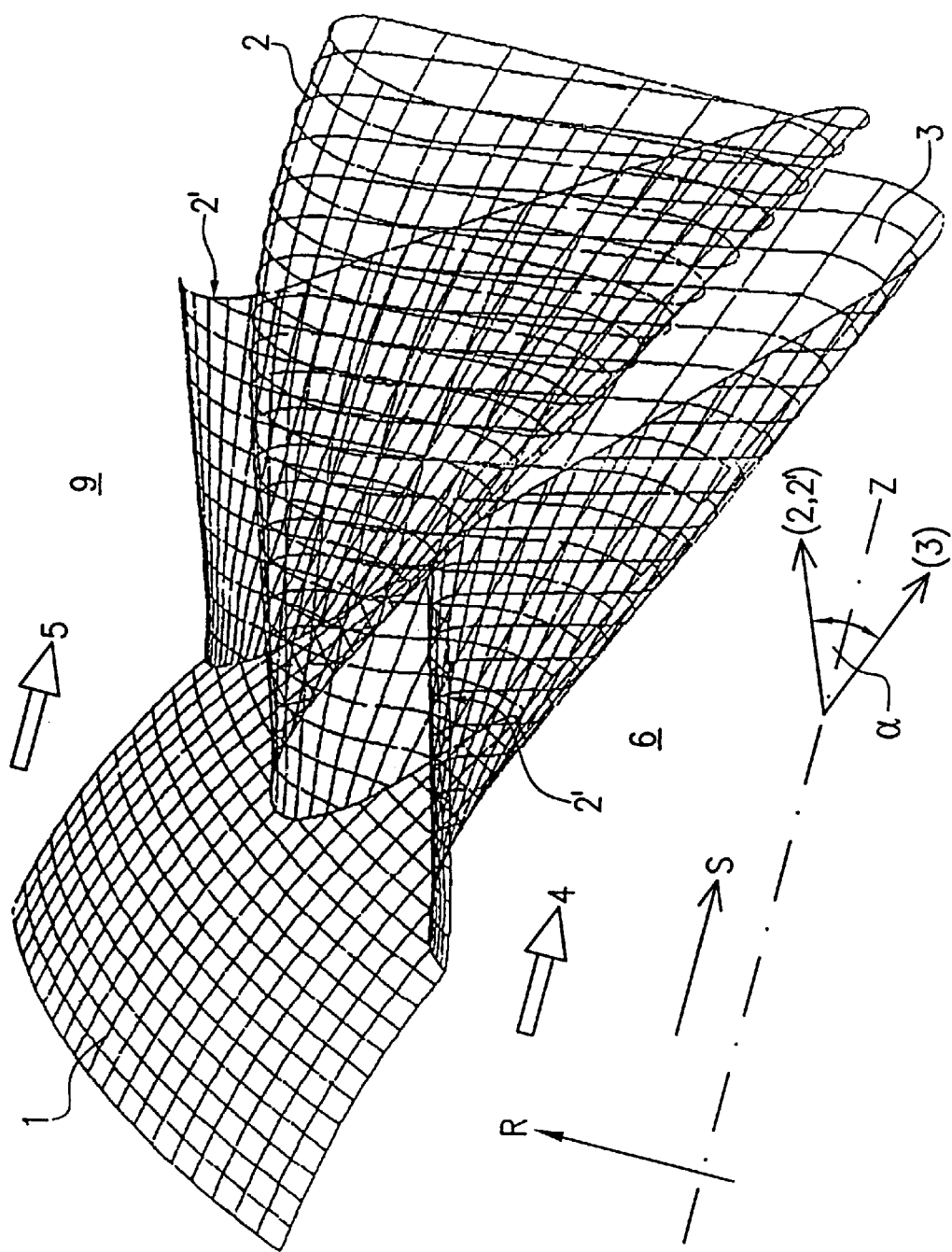
FIG. 2 is an isometric lateral view illustrating a segment A from FIG. 1 of the inventive lobe-type mixer tube. This view of FIG. 2 accordingly corresponds to a partial longitudinal sectional view of the lobe-type mixer tube taken in the direction of the gas flow through the tube.
Figure 3:
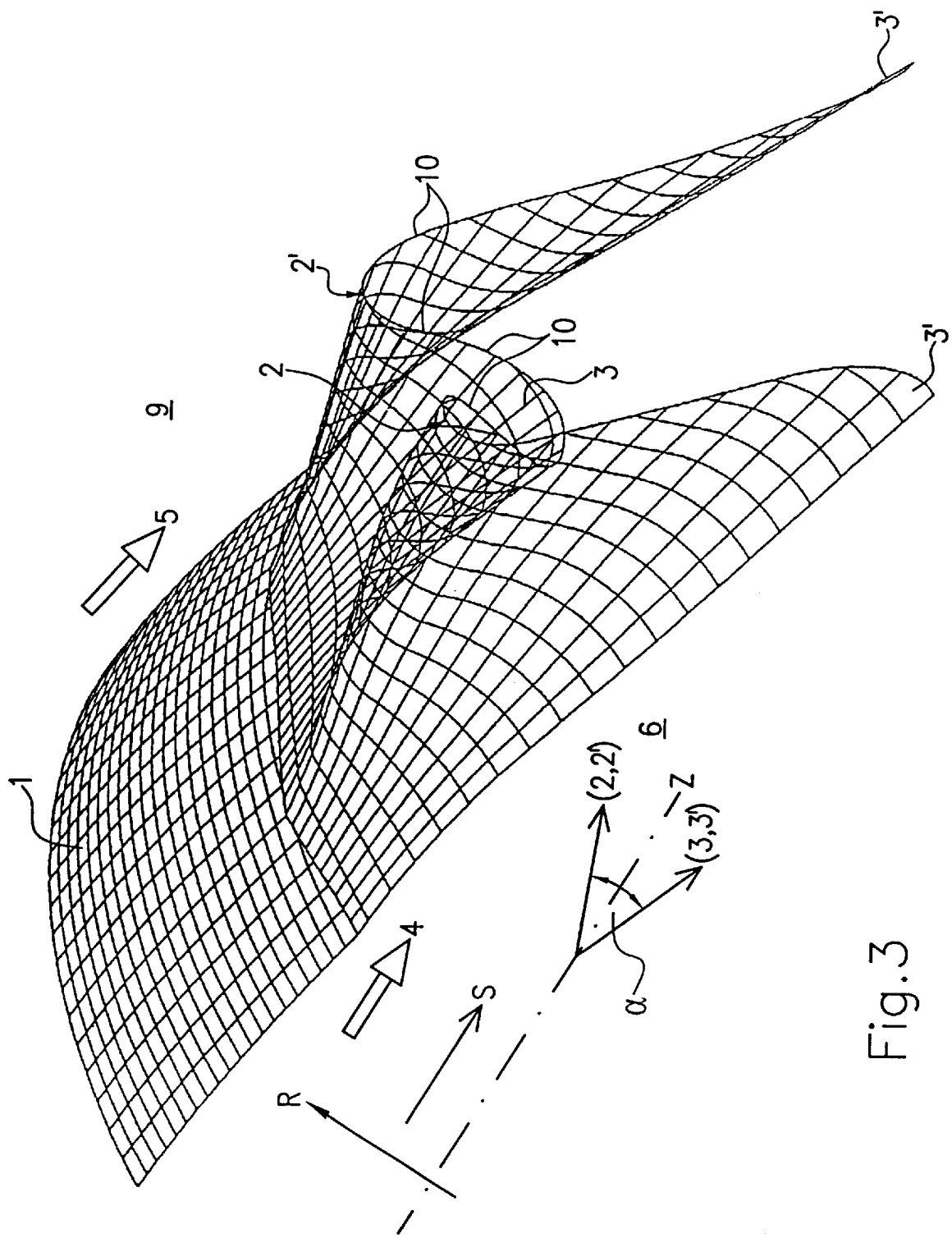
FIG. 3 is an isometric lateral view of a further embodiment illustrating a segment A from FIG. 1 of the inventive lobe-type mixer tube. This view of FIG. 3 accordingly corresponds to a partial longitudinal sectional view of the lobe-type mixer tube taken in the direction of gas flow through the tube.

As previously outlined the corrugated shape of cylindrical surface 1 forms gutter-shaped ducts 2, 2', 3, 3' which open toward the interior 6, or annulus 9. Routed in ducts 3 that are open toward annulus 9 is bypass flow 5, while the hot gas stream 4 is routed in ducts 2 that open toward interior 6, each in the flow direction S. In the conventional arrangement of lobe-type mixer tubes, said ducts 2, 2', 3, 3' extend, when viewed in the radial direction R (R being normal to centerline Z) of the lobe-type mixer tube, alternately moderately outward and inward, as shown in FIGS. 2, 3. In this arrangement, the ducts 2, 2' carrying the hot gas stream 4 are inclined moderately radially (R) outward, i.e. toward the exhaust tube 8, while ducts 3, 3' carrying the bypass flow 5 are radially (R) inclined moderately inward, i.e. toward centerline Z.

The lobe-type mixer tube has a certain longitudinal extent in the direction of centerline Z, i.e. ducts 2, 2', 3, 3' of the lobe-type mixer tube issue freely into an extreme section 10 (of. FIGS. 2, 3). In this arrangement, cylindrical surface 1 of the lobe-type mixer tube is truncated at the aft end, so that each extreme sections 10 of the various ducts 2, 2', 3, 3' essentially describes a plane of its own. Through these extreme sections 10, the gas flows carried in ducts 2, 2', 3, 3' issue aft, when viewed in flow direction S (this would be toward the right-hand side in the representation of FIGS. 2 to 4).

Since in accordance with the preceding explanations, ducts 2, 2' are additionally moderately inclined radially (R) outward and ducts 3, 3' radially inward, the gas flows issuing in flow direction S from the duct ends or from extreme sections 10 are optimally mixed together, i.e. extremely intensive mixing of the hot gas stream 4 with the bypass flow 5, takes place in the area downstream of extreme sections 10, or downstream of the lobe-type mixing duct.

As it will become apparent from FIG. 1, the (for clarity unnumbered) lateral walls, formed by the cylindrical surface 1 of the lobe-type mixer tube, of radially (R) moderately outward or inward directed ducts 2, 3 essentially lie in radial planes extending through the centerline Z of the lobe-type mixer tube, said lateral walls of each individual duct 2, 2', or 3, 3' essentially lying exactly parallel with each other. In this arrangement, compared with the state of the art e.g. in accordance with the repeatedly cited patent specification GB2 2 160 265 A, a relatively large number of ducts 2, 2', 3, 3' (24 or 20 each in the present embodiment) is provided. Simultaneously, as it will become apparent from FIGS. 2, 3, the angleα included between the defining lines, extending in the respective planes of symmetry, of an outward directed duct 2 or 2' and of an inward directed duct 3 or 3' is relatively wide. In contrast with the state of the art as for example described in GB 2 160 265 A, the ducts 2, 2' carrying the hot gas stream 4 are radially (R) inclined further outward, and ducts 3, 3' carrying the bypass flow 5 are inclined further inward. This arrangement provides a lobe-type mixer tube of high penetration and thorough mixing of the hot gas stream 4.

Figure 4:
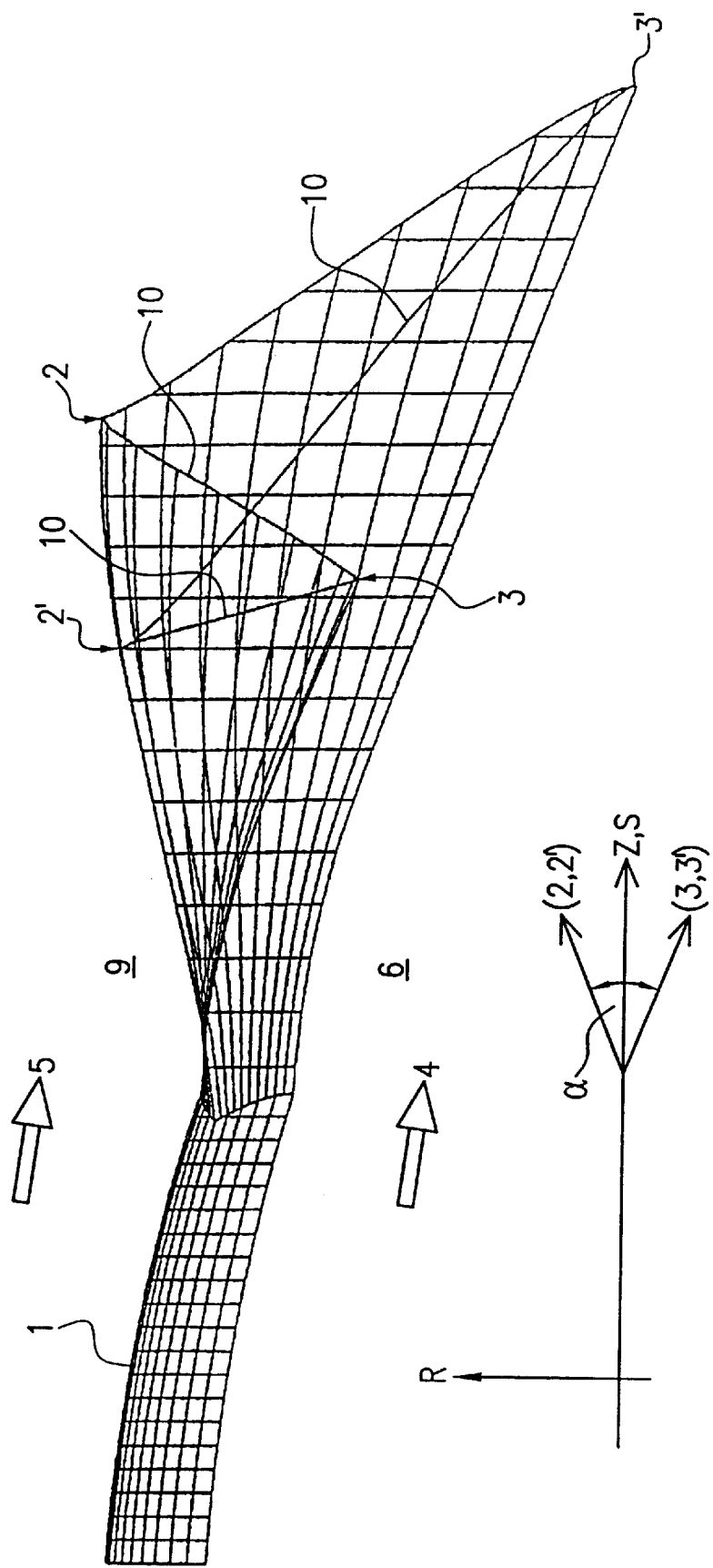
FIG. 4 illustrates a lateral view (viewed circumferentially)
Figure 5:
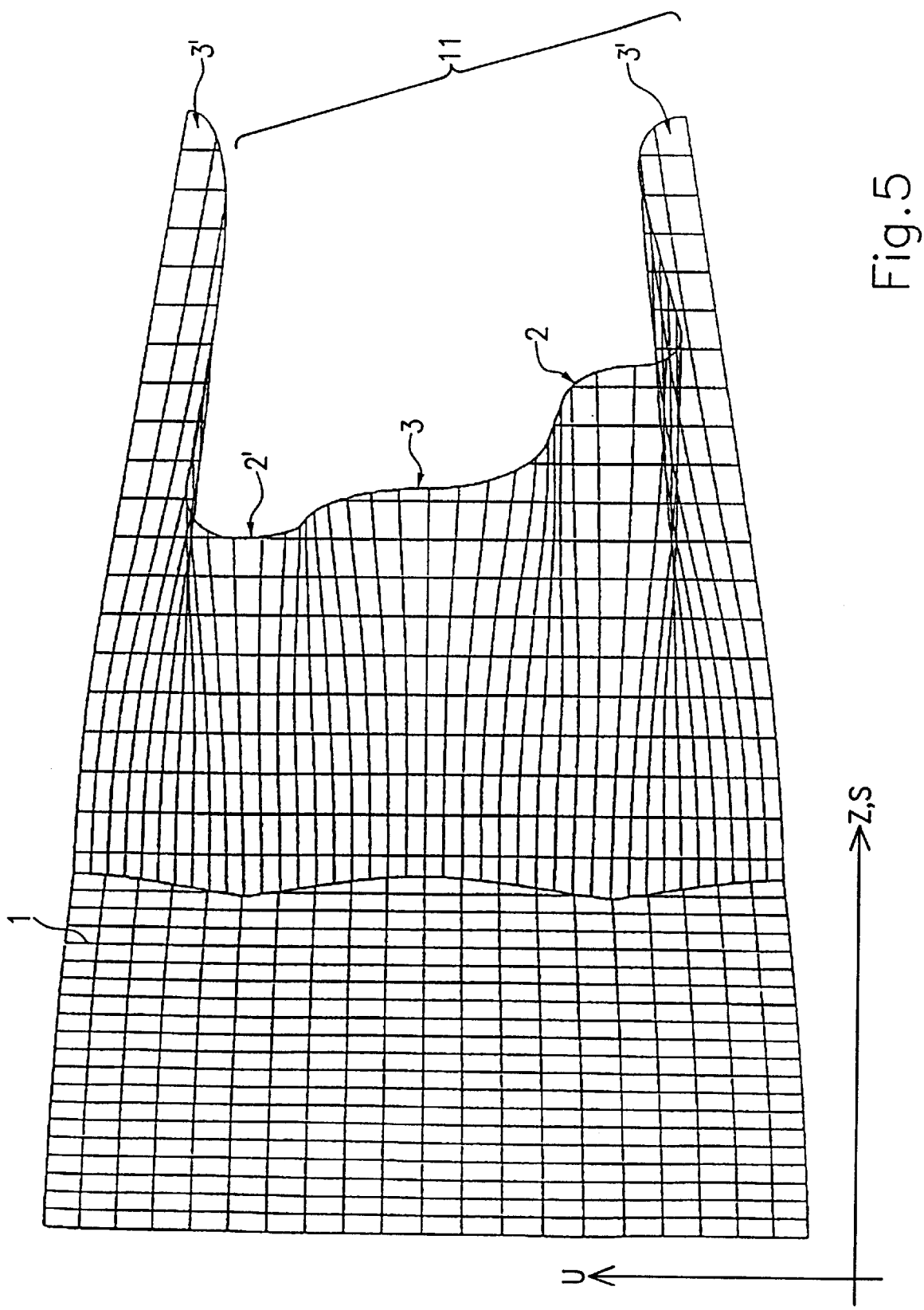
FIG. 5 a plan view (viewed radially inward) of the lobe-type mixer tube of segment of FIG. 3.

This arrangement of the lobe-type mixer tube is embarrassed by relatively high pressure loss in the lobe-type mixer tube and by relatively high mixer tube weight, owing to the large number of ducts 2, 2', 3, 3' and the associated large surface area of cylindrical surface 1. In order to eliminate these disadvantages, the lobe-type mixer tube is designed as described more fully below:

As it is shown in FIGS. 2 to 4, and when viewed across the circumference U or in the circumferential direction U (see also FIG. 1), every other radially (R) outward directed duct 2, 2' is heavily scarfed axially, i.e. in the direction of centerline Z. This means that every other duct 2, which for clarity is indicated by complementary reference number 2', is practically scarfed inversely, and when viewed in the direction of flow S terminates faster, or earlier, than the remaining, unscarfed ducts 2 and 3. In other words, the mouths of the radially outward directed ducts 2 or 2', when viewed in a circumferential direction U, are alternately offset in flow direction S. With regards to the second embodiment, this results in the following arrangement:

The practically inversely scarfed ducts are indicated with the numeral 2' and terminate faster, or earlier, than the other, radially outward directed unscarfed ducts indicated with the numeral 2. In other words, the mouths of radially outward directed ducts 2 or 2', when viewed in a circumferential direction U, are alternately offset in flow direction S, or when viewed in circumferential direction U, two each adjacent, radially outward directed ducts 2, 2' have different lengths, with any duct 2 here being longer than any duct 2'.

In a preferred aspect of the present invention, not only the radially moderately inward directed ducts 3, but also, viewed in circumferential direction U, every other of the radially moderately outward directed ducts 2 has an extreme section 10 that extends in a direction essentially normal to the centerline Z or may also be inclined forward, i.e. in the direction of flow S and accordingly is unscarfed. Whereas the radially outward directed ducts 2' lying between these ducts 2 having a central section 10 that extends normal to the centerline are scarfed counter the direction of flow S and are therefore scarfed inversely. The extreme sections 10 of these inversely scarfed ducts 2', accordingly are inclined aft vis-a-vis centerline 1, i.e. counter the direction of flow S.

Similarly, when viewed over the circumference U or in the circumferential direction U (of. FIG. 1), every other radially (R) inward directed ducts 3, 3' is heavily scarfed axially, i.e. in the direction of centerline Z. These scarfed ducts are indicated with the numeral 3' and terminate, when viewed in the direction of flow S, further aft, or later, than the other, radially inward directed ducts, which are indicated with the numeral 3 and are unscarfed. In other words, this means that the mouths of radially inward directed ducts 3 or 3', when viewed in the circumferential direction U, are alternately offset relative to each other in the direction of flow S, or that when viewed in circumferential direction U, two each adjacent radially outward directed ducts 3, 3' have different lengths, any duct 3' being longer than any duct 3.

The various ducts 2, 2', 3, 3' now are arranged such that when viewed in circumferential direction (U), a longer inward directed duct 3' is followed by a longer outward directed duct 2 which is followed by a shorter inward directed duct 3 which in turned is followed by a shorter outward directed 2'. These four circumferentially (U) successive ducts form (as best seen in FIG. 1) a group 11 that repeats over the entire circumference, meaning that several such groups 11 are provided over the circumference of the lobe-type mixer tube, where, as previously described, these groups 11 may repeat in a periodic or axially symmetrical fashion.

In a preferred arrangement, each longer inward directed duct 3' is heavily scarfed, while the shorter inward directed duct 3 is hardly or not at all scarfed inversely, i.e. the extreme section 10 of the shorter duct 3 extends nearly normal to the centerline Z, while the extreme section 10 of the longer, moderately radially inward directed duct 3' is heavily inclined in the direction of flow S. Of the moderately radially outward directed ducts, the shorter one indicated with the numeral 2' is moderately inversely scarfed. In this arrangement the extreme sections 10 of the inversely scarfed ducts 2', 3' are inclined aft vis-a-vis the centerline 1, i.e. counter the direction of flow S.

Through this arrangment, the three-dimensional nature of the mixing process is enhanced and so is the mixing efficiency. Also, the scarfing of the lobe-type mixer on its outer side as here described causes, owing to the surface area of its cylindrical surface 1 overproportionately growing in a radially (R) outward direction, a comparatively strong reduction in surface area, with the attending benefits of lower weight and optimized pressure loss. More particularly, it was also noted that such an arrangement will not additionally heat the exhaust tube 8, so that this arrangement does not carry any additional penalties. Whereas a number of advantages result, such as a reduction in pressure loss of the lobe-type mixer tube, and a reduction in the weight and the cost of the mixer tube. More particularly, the extensive distribution of hot gas stream 4 and the appreciably enhanced three-dimensional effect of the mixing process improve the mixing efficiency. It is apparent that a plurality of modifications especially in design other than these described herein may be made to the embodiment here shown without departing from the inventive concept.

What is claimed is:

1. A lobe-type mixer tube for a bypass jet engine in which a bypass flow delivered by a fan is mixed with a hot gas stream issuing from a core engine, said lobe-type mixer having essentially circumferentially equally spaced gutter-shaped, radially inward and outward directed ducts to guide both the bypass flow and the hot gas stream, said ducts each having an end formed by an essentially plane extreme section and the respective extreme sections of some ducts when viewed in a longitudinal section extending in a direction of flow being inclined vis-à-vis the extreme sections of the other ducts, so that the various ducts when viewed in the direction of flow issue at various points offset one from the other, wherein alternate ones of the radially outward directed ducts when viewed in the circumferential direction issue at points that are axially offset from each other in the direction of flow.

2. The lobe-type mixer tube in accordance with claim 1, wherein, when viewed in the circumferential direction, every other radially outward directed duct has an extreme section which extends essentially normal to a centerline of the lobe-type mixer or is inclined in the direction of flow, while the extreme sections of the intervening radially outward directed ducts are inclined counter to the direction of flow and these ducts accordingly are inversely scarfed.

3. The lobe-type mixer tube of claim 2, wherein lateral walls of the gutter-shaped ducts essentially lie in radial planes extending through the centerline of the lobe-type mixer tube, with the lateral walls of each duct running in parallel with each other.

4. The lobe-type mixer tube of claim 1, wherein lateral walls of the gutter-shaped ducts essentially lie in radial planes extending through the centerline of the lobe-type mixer tube, with the lateral walls of each duct running in parallel with each other.

5. A lobe-type mixer tube for a bypass jet engine in which a bypass flow delivered by a fan is mixed with a hot gas stream issuing from a core engine, said lobe-type mixer tube having essentially circumferentially equally spaced gutter-shaped, radially alternately inward and outward directed ducts to guide both the bypass flow and the hot gas stream, said ducts each having an end formed by an essentially plane extreme section and the respective extreme sections of adjacent ducts when viewed in a longitudinal section extending in a direction of flow being inclined relative to each other, so that the various ducts when viewed in the direction of flow issue at various points offset one from the other, wherein four each circumferentially successive ducts form a group that repeats over the entire circumference and consists of a pair of radially outward directed ducts and a pair of radially inward directed ducts, one each duct of a pair being shorter and the other duct of the pair being longer than the other, where when viewed circumferentially, a longer inward directed duct is followed by a longer outward directed duct, which is followed by a shorter inward directed duct which in turn is followed by a shorter outward directed duct.

6. The lobe-type mixer tube of claim 5, wherein the longer inward directed duct is heavily scarfed, while the shorter inward directed duct is little or not scarfed.

7. The lobe-type mixer tube of claim 6, wherein the shorter outward directed duct is inversely scarfed.

8. The lobe-type mixer tube of claim 7, wherein the group repeats at least one of periodically and axis-symmetrically over the circumference.

9. The lobe-type mixer tube of claim 6, wherein the group repeats at least one of periodically and axis-symmetrically over the circumference.

10. The lobe-type mixer tube of claim 5, wherein the shorter outward directed duct is inversely scarfed.

11. The lobe-type mixer tube of claim 10, wherein the group repeats at least one of periodically and axis-symmetrically over the circumference.

12. The lobe-type mixer tube of claim 5, wherein the group repeats at least one of periodically and axis-symmetrically over the circumference.

* * * * *